(12) United States Patent
Pitwon et al.

(10) Patent No.: US 7,805,033 B2
(45) Date of Patent: Sep. 28, 2010

(54) OPTICAL WAVELENGTH DIVISION MULTIPLEXED MULTIPLEXER/DEMULTIPLEXER FOR AN OPTICAL PRINTED CIRCUIT BOARD AND A METHOD OF MANUFACTURING THE SAME

(75) Inventors: Richard Charles Alexander Pitwon, Fareham (GB); David R. Selviah, Bedford (GB); Ioannis Papakonstantinou, London (GB)

(73) Assignee: Xyratex Technology Limited, Havant (GB)

( * ) Notice: Subject to any disclaimer, the term of this patent is extended or adjusted under 35 U.S.C. 154(b) by 100 days.

(21) Appl. No.: 11/862,630

(22) Filed: Sep. 27, 2007

(65) Prior Publication Data

US 2008/0107417 A1 May 8, 2008

Related U.S. Application Data

(60) Provisional application No. 60/847,403, filed on Sep. 27, 2006.

(51) Int. Cl.
*G02B 6/28* (2006.01)
(52) U.S. Cl. ............................. 385/24; 385/33; 385/36; 385/37
(58) Field of Classification Search ................. 385/14, 385/24, 33, 36
See application file for complete search history.

(56) References Cited

U.S. PATENT DOCUMENTS 5,818,994 A * 10/1998 Hehmann .................... 385/89

| | | | |
|---|---|---|---|
| 5,879,571 A * | 3/1999 | Kalman et al. ............... 216/26 |
| 6,553,162 B1 * | 4/2003 | Okayama ..................... 385/37 |
| 7,474,816 B2 * | 1/2009 | Payne .......................... 385/14 |
| 2004/0096150 A1 | 5/2004 | Laudo |
| 2005/0271322 A1 | 12/2005 | Oya |
| 2007/0092193 A1 | 4/2007 | Yokino |

FOREIGN PATENT DOCUMENTS

| EP | 0 043 475 | 1/1982 |
|---|---|---|
| EP | 0 073 310 | 3/1983 |
| EP | 1 363 145 | 11/2003 |
| JP | 53 098849 | 8/1978 |
| JP | 61182005 A * | 8/1986 |
| JP | 03-291603 | 12/1991 |
| JP | 2003 232943 | 8/2003 |
| WO | 01/38915 | 5/2001 |

OTHER PUBLICATIONS

European Search Report dated Jul. 9, 2007, 5 pages.

* cited by examiner

*Primary Examiner*—Sarah Song
(74) *Attorney, Agent, or Firm*—Pillsbury Winthrop Shaw Pittman LLP

(57) ABSTRACT

The invention provides an optical mux/demux for an optical printed circuit board. The mux/demux comprises: a first waveguide formed on a support layer for carrying a wavelength division multiplexed optical signal; a separator/combiner for separating the wavelength division multiplexed signal into component signals of corresponding wavelengths or for combining component signals into the said wavelength division multiplexed signal; and plural second waveguides, each for receiving or providing one or more of the said component signals, wherein the separator/combiner is at a predetermined location relative to the waveguides.

16 Claims, 10 Drawing Sheets

Wavelength separating element using a lens made from a dispersive material

AWG DESIGN

OPTICAL WAVELENGTH DIVISION MULTIPLEXED MULTIPLEXER/DEMULTIPLEXER FOR AN OPTICAL PRINTED CIRCUIT BOARD AND A METHOD OF MANUFACTURING THE SAME

This application claims the benefit of priority of U.S. provisional application Ser. No. 60/847,403, filed Sep. 27, 2006, the entire contents of which are incorporated by reference herein.

The present invention relates to an optical wavelength division multiplexed multiplexer/demultiplexer for an optical printed circuit board. The invention also relates to an optical printed circuit board and a method of manufacturing an optical multiplexer/demultiplexer and an optical printed circuit board.

In embodiments the invention relates to an optical wavelength division multiplexed multiplexer/demultiplexer including a multimode waveguide.

The application of optical printed circuit board technology to very short reach (VSR) applications is a developing concept but as data rates increase and approach 10 Gb/s and beyond, it is likely to become an attractive option. Advantages arise with the use of optical communications on a printed circuit board due to the fact that with optical communications, unlike with electrical communications, problems associated with high frequency data signals such as cross-talk, EMI (electromagnetic interference), skin effect are reduced or eliminated. In addition, the use of optical communications on backplanes enable significant increases in bandwidth to be achieved by permitting multiple signals to be conveyed along common paths or waveguides.

In VSR applications the emphasis has traditionally been on low-cost waveguide fabrication processes. In our co-pending U.S. patent application Ser. No. 11/125,341 having the filing date 10 May 2005, there is disclosed a Coarse Wavelength Division Multiplexed system for an optical backplane. The entire content of that application is hereby incorporated by reference.

Throughout this specification the terms "multiplexer" or "demultiplexer" are used to refer to the combination of the component that performs the actual combination or separation of component signals and the waveguides that serve to provide inputs or receive outputs from that component. Usually, but not always, a support is provided on which the multiplexer/demultiplexer may be provided or formed.

According to a first aspect of the present invention, there is provided an optical multiplexer/demultiplexer for an optical printed circuit board, the multiplexer/demultiplexer comprising a first waveguide formed on a support layer for carrying a wavelength division multiplexed optical signal; a separator/combiner for separating the wavelength division multiplexed signal into component signals of corresponding wavelengths or for combining component signals into the said wavelength division multiplexed signal; plural second waveguides, each for receiving or providing one or more of the said component signals, wherein the separator/combiner is at a predetermined location relative to the waveguides, the input/output interfaces of the waveguides being shaped to at least partially collimate light passing therethrough.

The invention provides an optical multiplexer/demultiplexer in which the input/output interfaces of the waveguides are shaped to at least partially collimate light passing therethrough. Therefore, it is possible that no other optical component may be required for use in the optical multiplexer/demultiplexer since any required collimation of the light may be provided by the waveguides themselves. Furthermore, as will be explained below such an arrangement may be formed in a simple and robust manner using techniques such as lithographic formation from a two-dimensional pattern of a mask. This enables the shape of the collimating structure to be selected accordingly.

According to a second aspect of the present invention, there is provided an optical multiplexer/demultiplexer for an optical printed circuit board, the multiplexer/demultiplexer comprising a first waveguide for carrying a wavelength division multiplexed optical signal; a separator/combiner for separating the wavelength division multiplexed signal into component signals of corresponding wavelengths or for combining component signals into the said wavelength division multiplexed signal; plural second waveguides, each for receiving or providing one or more of the said component signals, wherein the separator/combiner is at a predetermined location relative to the waveguides.

Preferably, one or all of the waveguides is or are formed on a support layer. Preferably, the separator/combiner is also formed on a support layer.

Preferably, the relative location of the separator/combiner with respect to the waveguides is determined during forming of the waveguides.

Preferably the waveguides are multimode waveguides. Accordingly, in an embodiment the invention provides a wavelength division multiplex/demultiplex structure for multimode waveguides which may be implemented lithographically on an optical printed circuit board. The use of multimode waveguides provides benefits in terms of the cost of fabrication and the ease of optical interconnection.

In the case where a multimode waveguide is used as the input (or output) waveguide, a number of other criteria must be satisfied if optimal performance is to be achieved. A first criterion relates to the separation of the output interface of the waveguide and the input interface of the separator/combiner. A second criterion relates to the phase difference of light that exits from different positions on the output interface. This will be explained in greater detail below.

As explained above, in one example, the multiplexer/demultiplexer may be formed on a support. Once formed, the support such as an FR4 PCB support, could be peeled or dissolved off and replaced by, for example, a suitable polymer potting compound.

Conventionally, in the case of demultiplexing when the input waveguide is a multimode waveguide it has been considered almost impossible to separate optical signals at different wavelengths. As will be explained below, this is due to the multimode waveguide allowing the light to travel at a wide range of angles within the waveguides numerical aperture. Each wavelength travels through the waveguide and emerges travelling within the same range of angles. A second problem is that the waveguide has a width, D, and that any one wavelength will emerge from each point across the output aperture of the waveguide with the full range of angles. So spatial position, angle and wavelength are mixed and difficult to separate. By ensuring that the distance between the output interface of the input multimode waveguide and the input interface of the separator/combiner is above some threshold, this problem may be solved.

In an embodiment, the invention provides an optical multiplexer/demultiplexer in which the relative location of the separator/combiner is defined during the forming of the waveguides. Accordingly, accurate alignment of the separator/combiner with respect to the waveguides is enabled. A simple and robust method is provided by which the position of the separator/combiner can be accurately guaranteed without requiring any complex alignment procedures.

According to a third aspect of the present invention there is provided a method of forming an optical multiplexer/demultiplexer for an optical printed circuit board, the method comprising on a support layer, forming a first waveguide for carrying a wavelength division multiplexed optical signal; on the support layer, forming plural second waveguides for carrying components of a said wavelength division multiplexed signal; during said step of forming the first and/or second waveguides determining the relative location of a separator/combiner for separating/combining the optical signals wherein a common mask is used to determine the relative location of the waveguides and the separator/combiner.

A method is provided by which an optical multiplexer/demultiplexer may be formed in a convenient and quick manner. In particular, an optical mask is used that includes the pattern of both the waveguides and that of the separator/combiner or some alignment projection against which a separator/combiner may be positioned. Thus, extremely accurate relative alignment between the separator/combiner and the optical waveguides can be achieved.

The invention and embodiments provide a method of forming an optical printed circuit board in which the relative location of a separator/combiner for a multiplexer/demultiplexer is determined during the formation of the optical waveguides. Thus, accurate relative alignment is assured between the optical waveguides and the separator/combiner.

The use of a relatively simple method of manufacture enables optical printed circuit boards with multiplexers/demultiplexers to be manufactured cost effectively. Furthermore, where multimode waveguides are used, low-cost fabrication can be utilised and greater resilience to environmental factors is provided. In addition, the resulting structure may be formed in a single step and therefore there is no additional cost to the fabrication process to form the optical waveguides themselves. As well as lithographic techniques, other known techniques for forming such optical components may be used.

According to a further aspect of the present invention, there is provided an optical printed circuit board comprising: a first waveguide (e.g. a multimode waveguide) for carrying a multiplexed optical signal formed of plural component optical signals; plural second optical waveguides (e.g. multimode waveguides) each for carrying at least one of the components of the multiplexed optical signal; and a separator/combiner for separating the multiplexed signal into its components or for combining the components into the multiplexed signal.

Preferably, the position of the separator/combiner is predetermined with respect to the position of the waveguides.

According to a further aspect of the present invention, there is provided an optical multiplexer for an optical printed circuit board, the multiplexer comprising: a first multimode waveguide for carrying a multiplexed optical signal; one or more second waveguides, each for carrying a component of the multiplexed optical signal; and an optical separator/combiner for separating the multiplexed optical signal into components or for combining the components into the multiplexed optical signal, wherein the separation between the first multimode optical waveguide and the optical separator/combiner is sufficient such that the angular range of direction of propagation of light entering the separator/combiner from the first multimode optical waveguide is sufficiently small to enable separation of wavelength components. In other words, light entering the separator/combiner from the first multimode optical waveguide is sufficiently unidirectional for separation.

Preferably, the distance (z) between the first multimode optical waveguide and the optical separator/combiner is determined by the equation:

$$z > \frac{2D^2 (\cos\theta)^2}{\lambda}$$

in which
D is the diameter or width of the waveguide;
$\lambda$ is the wavelength of the light in question; and,
$\theta$ is the angle that the rays in question travel from the main longitudinal waveguide axis.

If the input waveguide is multimode, then in order for the demultiplexer to work, the separator/combiner must be sufficiently far away from the waveguide so that the angular range of directions of propagation of the rays is sufficiently small to allow different wavelengths to be separated in angle. If there is too much divergence of each oft the individual wavelengths in angle then the different wavelengths will overlap and will not be completely separated.

In the case of diffractive separators/combiners (such as curved gratings) the path lengths from each point on the output face of the input waveguide to each point on the input face of the output waveguide must not differ by more than a fraction of a wavelength (e.g. a small fraction such as, say, about 0.0016×wavelength or (1/600)×wavelength=~0.00136 µm=0.01 radians in phase=0.573° in phase) in order for there to be the necessary constructive and destructive interference. This may be referred to as a "phase condition" and it applies for both single and multimode waveguides and is a requirement of diffraction. This is part of the reason that the curved grating is arranged to lie along a wavefront.

In one example, the maximum difference in distance from each horizontal edge of the input waveguide exit face to the nearest and furthest part of the nearest surface of the wavelength separating element to the waveguide should be less than a fraction of a wavelength.

In the case of an arrayed waveguide grating multimode interference coupler region, this phase condition must be met. In the case of an array of microprisms all of the light arriving at the output waveguides for any one wavelength is preferably in phase. This means that the path through one microprism compared to the path through the next microprism must either be the same length or must differ by an integer number of wavelengths.

The cut off section of the refractive Fresnel lens is also subject to this condition as it is effectively an array of microprisms in cross section each having a different apex angle. The cut off section of diffractive Fresnel zone plate is also subject to the same condition. The phase condition need not be met for the single large prism for continuous wave unmodulated light. The part of a lens WDM demultiplexer automatically ensures that the phase condition is met.

A further requirement is needed if very high bit rate modulated light is used, as is anticipated, to send data. In this case a path length condition must be met by all separator/combiners. The path lengths from each point on the output face of the input waveguide to each point on the input face of any of the output waveguides for each wavelength must not differ by more than a fraction of a bit length (e.g. a small fraction such as, say, 1/1000 of the bit length which for 10 Gb/s data is 19 µm). This requirement is less tight than the phase condition. If this requirement is not met then adjacent bits in time begin to overlap in what is known as intersymbol interference (ISI) which can lead to errors when trying to recognise the value of the bit.

The use of waveguides that are multimode enables lower manufacturing tolerances to be used and therefore reduces the cost of manufacture.

An optical printed circuit board is also provided having an optical WDM multiplexer/demultiplexer according to any other of the aspects of the present invention. Other components typically provided as part of an optical printed circuit board may also be provided.

According to a further aspect of the present invention, there is provided an optical multiplexer/demultiplexer for an optical printed circuit board, the multiplexer/demultiplexer comprising a first waveguide formed on a support layer for carrying a wavelength division multiplexed optical signal; a separator/combiner for separating the wavelength division multiplexed signal into component signals of corresponding wavelengths or for combining component signals into the said wavelength division multiplexed signal; plural second waveguides, each for receiving or providing one or more of the said component signals, wherein the separator/combiner is at a predetermined location relative to the waveguides, wherein the separator/combiner is a prism of continuous uniform composition throughout.

Thus, in contrast to prisms such as photonic crystal prisms, the prism used in this respect of the present invention is of simple, easy to manufacture and cheap form.

Examples of embodiments of the present invention will now be described in detail with reference to the accompanying drawings, in which.

Figure 1A:
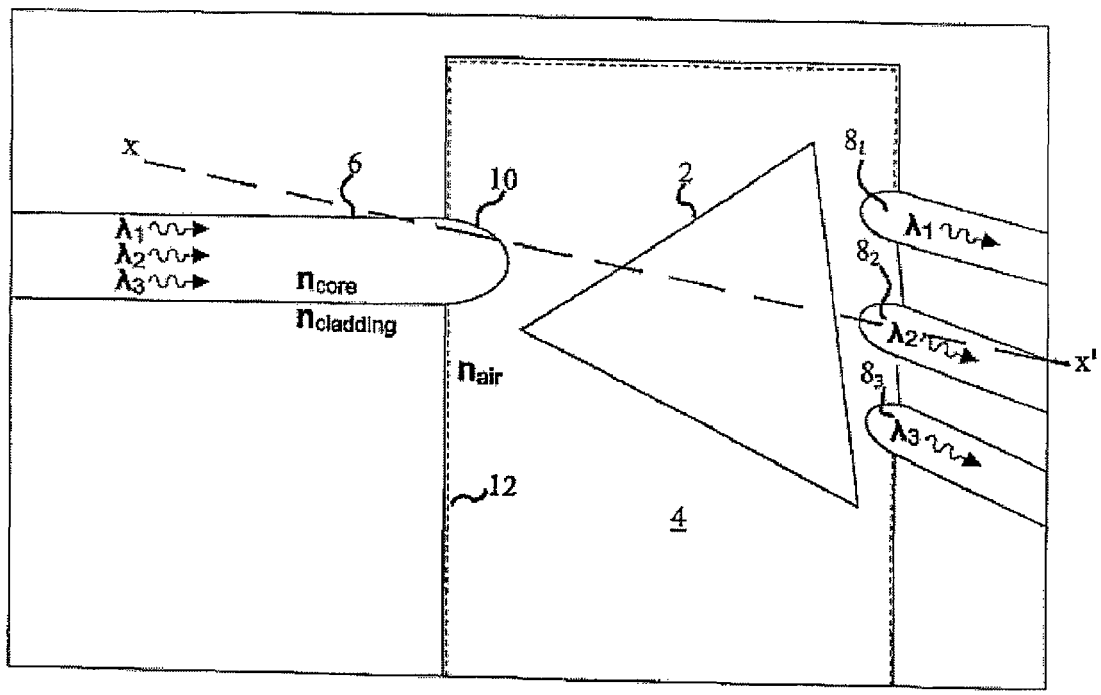
FIG. 1A shows an example of a multiplexer/demultiplexer in an optical printed circuit board.
Figure 1B:
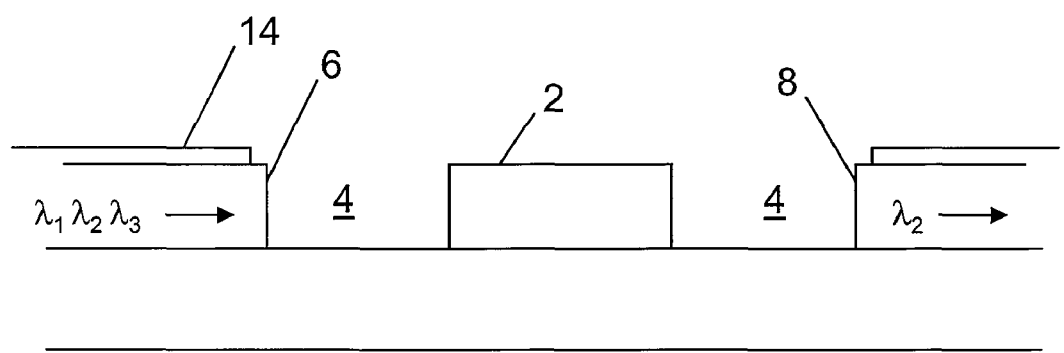
FIG. 1B shows a section along the line XX' in FIG. 1A.

FIG. 1A shows a plan view of an optical multiplexer/demultiplexer on an optical printed circuit board. FIG. 1B shows a section along the line XX' in FIG. 1A. The multiplexer/demultiplexer comprises a prism 2 formed of a dispersive material, i.e. a material in which the speed of light in the material depends upon its wavelength, arranged within a region 4 of an optical printed circuit board. In this example, the prism functions as a separator/combiner.

A first waveguide 6 is provided on one side of the prism 2 and plural second waveguides $8_1$ to $8_3$ are provided on an opposite side of the prism 2. In use, a multiplexed optical signal propagates along the first waveguide 6 until it reaches the end 10 of the waveguide. From there, the multiplexed optical signal including component signals at different wavelengths $\lambda_1$ to $\lambda_3$, is transmitted across the region 4 to be incident upon one side of the prism 2.

The wavelengths $\lambda_1$ to $\lambda_3$ of the components are different and therefore when the multiplexed signal is incident upon the prism 2, due to the dispersive nature of the prism, the individual components $\lambda_1$ to $\lambda_3$ will undergo different amounts of refraction. Thus, light travels through the prism and refracts again at the output surface and then travels again a sufficient distance before the individual wavelength components can be coupled into the output waveguides.

Therefore, the multiplexed signal is split into its individual wavelength components. The second waveguides $8_1$ to $8_3$ are positioned at appropriate locations such as to receive a respective one of the demultiplexed components signals. As shown in the example, the uppermost waveguide $8_1$ receives the signal at wavelength $\lambda_1$, the middle waveguide $8_2$ receives the optical signal at wavelength $\lambda_2$ and the bottom second waveguide $8_3$ receives the optical signal at wavelength $\lambda_3$.

The end 10 of the first waveguide 6 may be shaped to form a lens structure to thereby produce a collimating lensing effect such as to counteract the divergence of the components of the multiplexed optical signal as it leaves the waveguide 6. The waveguide may be formed lithographically from a two-dimensional pattern on a mask and so the collimating structure may be selected accordingly.

This means that the refractive index difference between the lens structure and the surrounding air will be much larger than that of the straight part of the waveguide 6 which is surrounded by cladding. Thus, significant optical wave-shaping may be achieved to produce a collimation effect. If the region 4 were filled with cladding then the relatively small refractive index difference between the waveguide core and the cladding material could well be insufficient to allow a normal lens shape to change the beam shape so dramatically as required.

The collimated beam then traverses the free space in the region 4 and impinges upon the prism structure 2. As will be explained below, the waveguides 6 and $8_1$ to $8_3$ and the prism structure 2 may be formed in the same manufacturing step. This ensures accurate alignment or relative positioning of the waveguides and the prism structure.

The component signals $\lambda_1$ to $\lambda_3$ undergo refraction through the prism and separate spatially. A lens may be provided between the input and the wavelength separator to ensure that the input beam is sufficiently collimated if the wavelength components are to be separated spatially. This level of refraction is made possible by the relatively large refractive index difference between the polymer that forms the prism 2 and the air or other suitable medium in the region 4 of the optical printed circuit board.

The spatially separated components $\lambda_1$ to $\lambda_3$ exit the prism structure and are received by the separate waveguides $8_1$ to $8_3$, each having a similar lens termination to that of the first waveguide 6. If the component signals are travelling in the desired directions then the collimating lens structures at the end regions of the waveguides $8_1$ to $8_3$ act to focus the collimated signals into the corresponding waveguide cores.

In a preferred embodiment, once the prism 2 and waveguides 6 and $8_1$ to $8_3$ have been formed on the optical printed circuit board, and the cladding has been provided to define the region 4 surrounding the waveguides and the prism, a protective barrier or lid of some appropriate form may be provided over the region 4 so as to protect the open space between the prism and the waveguides from becoming filled with dirt, dust or other such undesirable material.

FIG. 1B shows a section along the line X-X' in FIG. 1. As can be seen, in the example shown, the region 4 surrounding the prism 2 contains only air and is free of the cladding material. This ensures a large relative refractive index difference between the waveguides 6 and $8_1$ to $8_3$, prism 2 and the surrounding region to ensure that sufficient refraction of the component signals occurs so that the device operates as desired. Whatever fills the region 4, it is necessary that it has a suitably low refractive index. The cladding 14 is shown on top of the waveguides 6 and 8 in the section shown in FIG. 1B. In practice, the cladding material 14 will surround the long regions of the waveguides as shown in the plan view of FIG. 1.

To manufacture a multiplexer/demultiplexer for an optical PCB as shown in FIGS. 1A and 1B, initially a lower cladding layer is provided on the entire upper surface of a support layer (such as FR4) of the optical printed circuit board. Next the waveguides 6 and $8_1$ to $8_3$ and the prism 2 are formed from a curable polymer.

To do this, an optical mask may be used. The optical mask preferably includes both the pattern of the waveguides and the prism. This means that extremely accurate relative alignment between the prism and the optical waveguides can be achieved. Since the prism 2 and the waveguides 6 and 8 are preferably formed using a common mask this means that there is no difficult alignment required to form the prism once the waveguides have been formed. This is explained in greater detail below with reference to FIG. 8.

In another example, instead of actually forming the prism from the same polymer material used to form the waveguides, an alignment feature or projection (not shown) may be formed in the same step as the formation of the waveguides. A separate prism can then be inserted manually in alignment with the alignment feature or projection. Thus, again the alignment of the prism is determined during formation of the waveguides and therefore accurate alignment between the prism and the waveguides is easily achieved. This is explained in greater detail below with reference to FIGS. 9 to 11.

The region 4 may typically be in the shape of a channel so that once the cladding has been cured in the desired regions, the uncured material within the region 4 can easily be run off the resulting structure.

The multiplexed signal propagating along the primary waveguide 6 includes components at different wavelengths.

The component signals at the egress point at the end 10 of the waveguide 6 will not be exactly collimated. This is because all of the light in the waveguide travels at a range of angles and also due to diffraction at the output. The diffraction effect is more important in single mode waveguides. The range of angles in the waveguide is more important for multimode waveguides.

Different wavelengths diffract by different amounts. If the lens at the end of the waveguide 10 were designed to collimate perfectly a median wavelength to those conveyed along the waveguide then some egress signals would be slightly diverging and some slightly converging. For this reason, the lens in the region 10 of the waveguide 6 is preferably formed so as to collimate the longest wavelength available and thereby cause slight convergence of other wavelengths in the multiplexed signal.

The lenses formed in the end regions of the waveguides $8_1$ to $8_3$ are adapted to take into account the varied levels of convergence, such that accurate imaging occurs for the wavelength in question in the receiving waveguide. In other words, the degree of convergence provided by the lenses at the ends of the waveguides 6 and $8_1$ to $8_3$ are different, the magnitude of difference being dependent on the required power of the respective lenses.

So far, the description has been of the function of the device described in FIGS. 1A and 1B as a demultiplexer since a multiplexed signal comprising plural components is shown as travelling along the primary waveguide and through the prism into the secondary waveguides. It will be appreciated that the apparatus also can function in "reverse" such that the apparatus can serve to multiplex signals if each of the waveguides 8 has a signal propagating in the opposite direction (right to left in FIG. 1A). If this were to happen then the prism would serve to multiplex these signals into a single multiplexed signal propagating right to left in the primary waveguide 6.

Preferably the waveguides are multimode waveguides. This ensures that fabrication is simpler and optical interconnection with the waveguides is relatively simple. Single mode waveguides could be used. Where multimode waveguides are used it is preferred that the separation of the output interface of the input multimode waveguide is sufficient such that the angular range of direction of propagation of light entering the separator/combiner from the first multimode optical waveguide is sufficiently small to enable separation of wavelength components. Where the waveguides are multimode, there are certain requirements regarding the shape of the ends of the waveguides to ensure that collimation can occur. This is explained in greater detail below.

Preferably, the distance (z) between the first multimode optical waveguide and the optical separator/combiner is determined by the equation:

$$z > \frac{2D^2(\cos\theta)^2}{\lambda}$$

in which

D is the diameter or width of the waveguide;

λ is the wavelength of the light in question; and,

θ is the angle that the rays in question travel from the main longitudinal waveguide axis. This is sufficient to ensure that the angular range of direction of propagation of light entering the separator/combiner from the first multimode optical waveguide is sufficiently small to enable separation of wavelength components.

In the example shown in FIGS. 1A and 1B, since the entrance face of the prism is flat, the arrangement is unlikely to meet the phase condition unless (i) incident light is changed from a curved to a plane wavefront or (ii) the wavefront is made very small or (iii) the entrance face of the prism is curved to match the curved shape of the wavefront.

The first case (i) may be achieved by placing a lens with one or two curved surfaces between the exit of the input waveguide and the wavelength separating element and similarly between the wavelength separating element and the output waveguide. No lens can perfectly collimate (make plane the wavefront) light from a multimode waveguide, however by making the lens diameter very large and placing it at its focal length away from the input waveguide exit face and ideally placing the wavelength separating element at a similar distance of the focal length from the lens, the lens will form a far field pattern on the prism. However, in some cases the far field pattern may not be sufficient to meet the phase condition so it may also be necessary to reduce the size of the prism to meet this condition.

In the second case (ii) as will be explained below with reference to FIG. 2, a small prism or "microprism" is used. However, this microprism will only meet part of the wavefront and so an array of microprisms is preferably used to meet the whole wavefront. The individual microprisms are preferably placed along the curve of the wavefront. These will give several diverging beams angled at different angles for different wavelengths. A focussing lens is needed to convert the diverging beams into converging beams which focus on the output waveguides.

In the third case (iii) the face of the prism must be curved. In effect the prism is part-cut from a lens made from a dispersive material.

Figure 2:
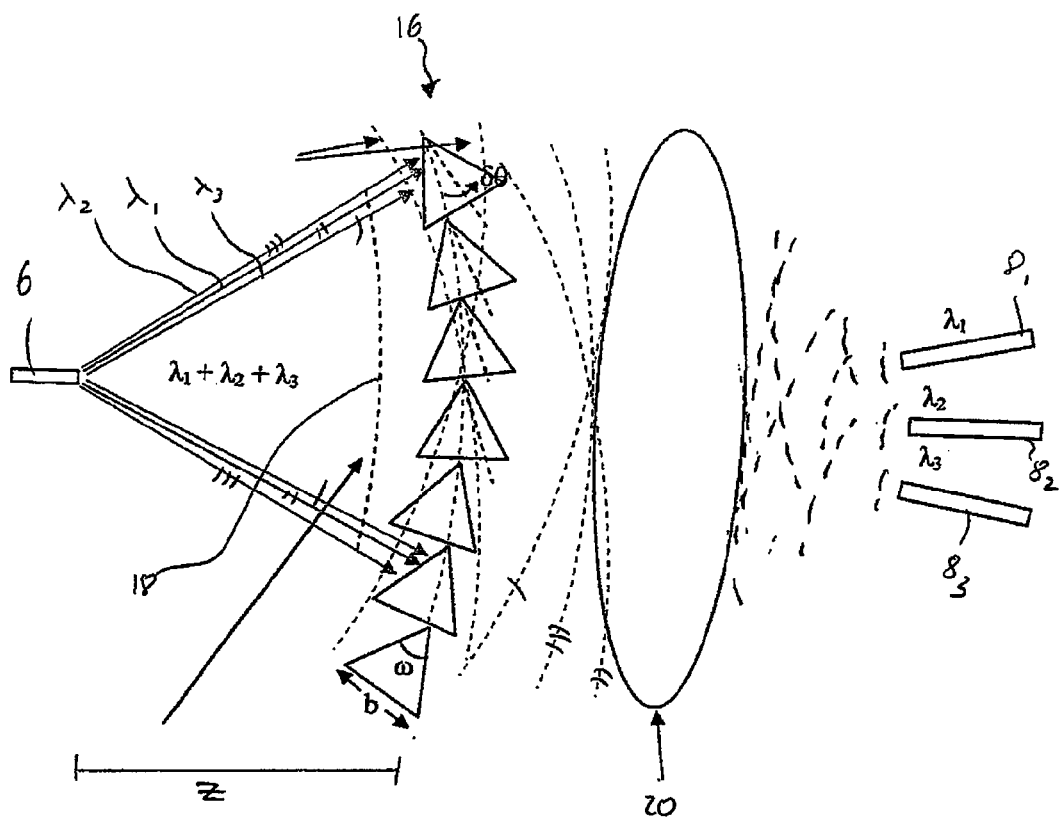
FIG. 2 shows an example of a micro-prism array for use in an optical multiplexer/demultiplexer.

FIG. 2 shows an example of an optical multiplexer/demultiplexer for use on an optical printed circuit board in which a microprism array 16 is provided. As explained above, the microprism array comprises plural prisms arranged to receive a multiplexed optical signal from a first waveguide 6. In the examples shown, like the example of FIG. 1, the multiplexed optical signal comprises component signals at three wavelengths $\lambda_1$, $\lambda_2$ and $\lambda_3$.

The microprism array is arranged at a separation z from the interface (output in this case) of the primary waveguide 6. For a relatively large distance z, the waveguide 6 appears as a point source emitting curved wave fronts 18. The microprism array 16 is made up of similar prisms with a common prism angle ω and base width b. The base width b and angle ω are selected so that wave fronts are substantially constant along the whole prism length. In other words, the individual prisms are oriented along the direction of the curved wave fronts in such a way that light traverses them to maximum prism efficiency.

Each of the microprisms collects a small portion of the wave front and rotates it by a small angle depending on the wavelength of the light. The total effect is an overall tilt of the wavefront, the tilt depending on the wavelength. After traversing the microprism array, light still diverges but appears as if it is coming from three different waveguides, corresponding to the three component wavelengths $\lambda_1$, $\lambda_2$ and $\lambda_3$. A lens 20 is positioned at the focal length between the microprism array and the output waveguides to focus light into the output waveguides $8_1$ to $8_3$.

Although not shown in FIG. 2, a cladding may be provided over the waveguides 6 and $8_1$ to $8_3$. In the example shown, no rod lenses are required since the lens 20 together with the microprism array 16 serves to direct and focus the demultiplexed component signals into the waveguides $8_1$ to $8_3$. Again, as in the example shown in FIGS. 1A and 1B, the waveguides and the prisms of the microprism array 16 may be formed from the same material in the same manufacturing step. In other words, it is preferred that a common mask is used to form all of the optical components shown in FIG. 2 in the same manufacturing step Therefore, accurate relative alignment is easily achieved.

The lens 20 can be formed during the same manufacturing step using the same mask but alternatively an alignment feature can be formed and an external lens can be inserted after manufacture of the waveguides and the prisms in the microprism array.

Figure 3:
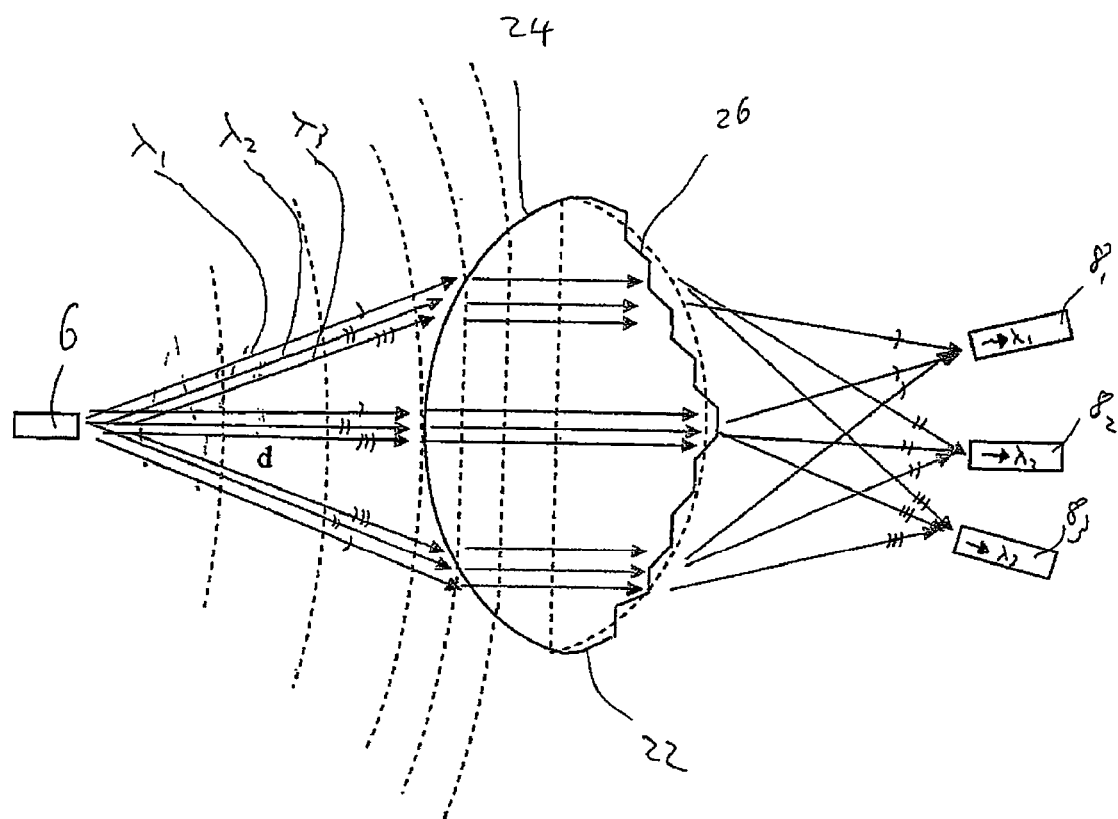
FIG. 3 shows an example of a lensed grating for use as a multiplexer/demultiplexer in an optical printed circuit board.

FIG. 3 shows a lensed grating for use as a multiplexer/demultiplexer. The optical component 22 integrates a collimating lens 24 with a transmissive grating 26. The distance d in this case is selected to be large enough such that the waveguide 6 functions as a point source. The waveguide is placed at the object focus point of a collimating lens which converts the curved wave fronts to planar wave fronts. On the opposite side of optical component 22, a concave diffraction grating is formed. In this way, rays of different wavelength are angularly separated and focussed at different points as shown. Thus, the desired demultiplexing effect is achieved.

In all of the examples described above, a multiplexer/demultiplexer for an optical printed circuit board is provided. In all of the examples, a primary waveguide 6 for carrying a multiplexed optical signal and plural waveguides $8_1$ to $8_3$ for carrying components of the multiplexed signal may be formed together with an optical component for performing the actual multiplexing/demultiplexing operation. The waveguides and the optical component may be formed in the same step during manufacture, thereby ensuring accurate relative alignment between them all so as to ensure that the multiplexer/demultiplexer functions as required.

In one example, instead of forming the optical component (separator/combiner) for performing the actual multiplexing/demultiplexing operation simultaneously with the waveguides, an alignment feature or projection (not shown) may be formed during the same step as the formation of the waveguides. Then the optical component for performing the multiplexing/demultiplexing can be inserted manually in alignment with the alignment projection and therefore relative alignment with the waveguides 6 and $8_1$ to $8_3$ is assured.

To manufacture the multiplexer/demultiplexer, initially a lower cladding layer is formed on a PCB support material such as FR4. Then, a layer of curable liquid polymer is formed on the lower cladding. This is patterned to provide the waveguides and multiplexing/demultiplexing component or a corresponding alignment feature or projection. The uncured liquid polymer is then removed and optionally a further cladding layer is provided in required regions of the resultant structure. Thus, since the relative alignment of the multiplexing/demultiplexing component and the input and output waveguides is determined during the same step of manufacture, accurate relative alignment is assured.

Figure 4:
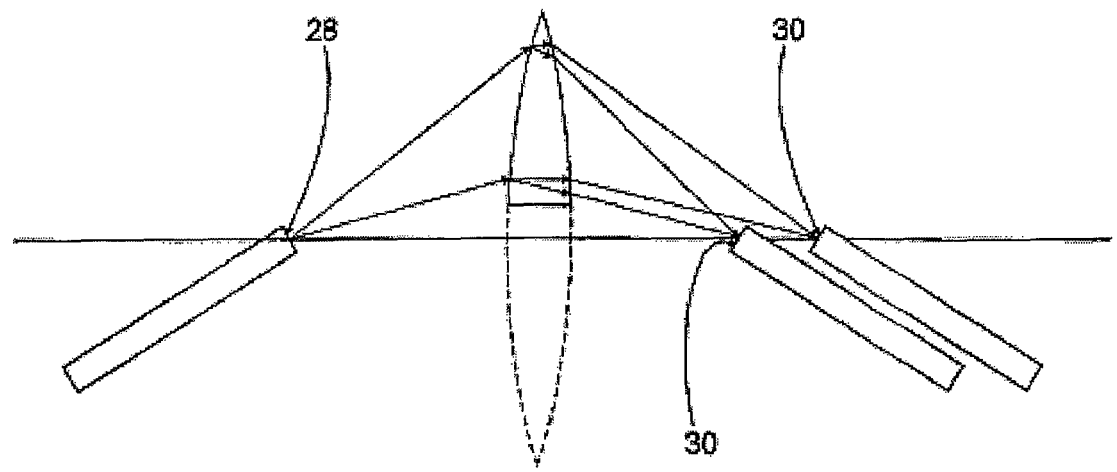
FIG. 4 shows an example of a separator formed of a lens made of a dispersive material.

Referring now to FIG. 4, a prism is shown being part formed or cut from a lens made from a dispersive material. This will be described in detail below with reference to FIG. 5. The dispersive effect of the lens material is usually considered to be undesirable as it causes chromatic aberration so that one wavelength is brought to a focus nearer the lens than another focus for a different wavelength.

In this case, the effect is desirable. Moreover, in the dimension normal to the plane, if the shape of the element is also that cut from a spherical circular lens then the lens has the added benefit if it is placed at a distance of twice the focal length from the input waveguide exit 28 and similarly from the output waveguides, that it images the output face of the input waveguide onto the input face of the output waveguide and so reduces loss by spreading out of the plane. A lens placed in this imaging configuration also has the benefit that all of the optical path lengths are the same from the exit of the input waveguide to the inputs 30 to the output waveguides and so it can operate at very high bit rates for the light modulation.

If the lens is replaced by a Fresnel non-diffractive lens made from a dispersive material a wavelength separating element can again be made. However this will not operate at high bit rates since all of the paths are different through each of the sub elements of the lens resulting in spreading of each pulse and overlapping of the pulses. The benefits of low loss for out-of-plane diverging beams are retained.

If the lens is replaced by a Fresnel diffractive zone plate lens made from a non-dispersive material then it will also operate as a wavelength separating element. In this case though, the shorter wavelength or blue light comes to a focus further from the lens than the longer wavelength red light the opposite of the case with dispersion. The reason for this is that diffraction is occurring instead of dispersion. However, again this does not operate well at high bit rates since the paths of differently angled rays will be different lengths between the input and output waveguides. The benefits of low loss for out-of-plane diverging beams are retained.

Figure 5:
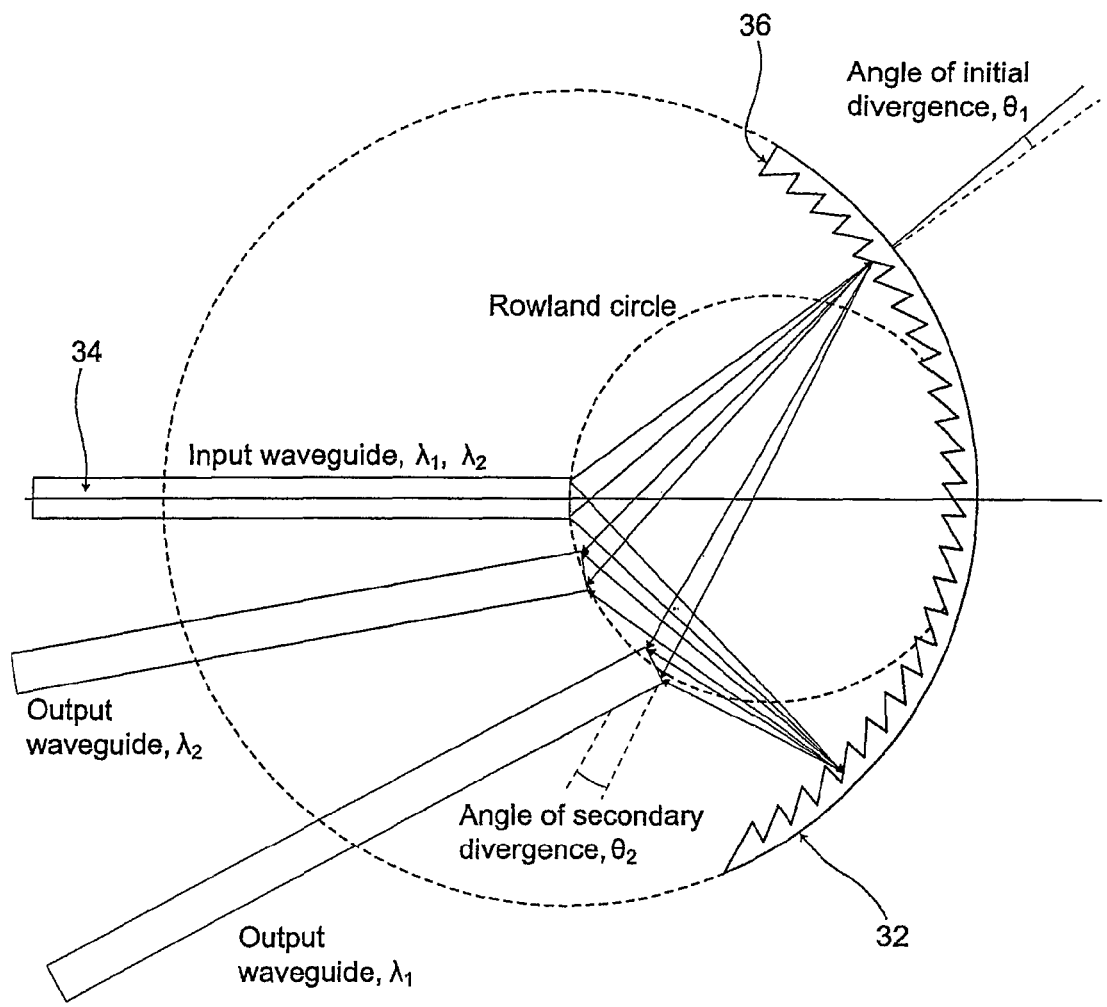
FIG. 5 shows an example of a multiplexer/demultiplexer utilising a curved reflecting blazed grating.

FIG. 5 shows an example of a wavelength demultiplexer separator including a curved reflecting blazed grating. It is based on a curved ideally spherical mirror which ordinarily would reflect all of the diverging rays from the input waveguide back into the input waveguide. However it has been modified with the inclusion of a blazed grating on the surface which, by diffraction, causes different wavelengths to be additionally reflected through different angles. Where one or more of the waveguides are multimode waveguides, the mirror must be placed beyond the critical distance determined by the far field and phase conditions to obtain the required separation of wavelengths which are close to one another in wavelength. In contrast to the microprism array, the curved reflecting blazed grating works by diffraction and not dispersion of the light signals.

An alternative version of this system is to have a planar blazed grating as the wavelength separating element and to place a lens between it and the input waveguide with each element separated by the focal length of the lens. The lens should have a sufficiently large diameter and focal length to sufficiently collimate the light so that it is incident onto the grating almost normally. If the grating is reflective by being coated in a mirror or metallic layer for example, then this combination of lens and reflective grating can be used to replace the reflective curved grating in FIG. 5.

Figure 6:
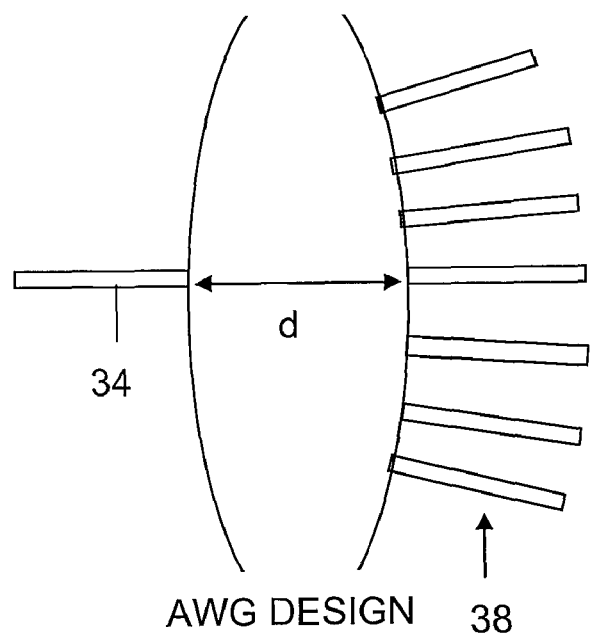
FIG. 6 shows an example of part of an arrayed waveguide grating.

If the blazed grating is transmissive then a second lens is required on the other side of the wavelength selective element to focus the light into one of several foci which are laterally displaced as shown in FIG. 6. The focussing lens should have a sufficiently large diameter and focal length to adequately focus the light and should be placed one focal length from wavelength selective element and from the output waveguides.

In another embodiment, a part of which is shown schematically in FIG. 6, an arrayed waveguide grating (AWG) may be used. In contrast to known arrayed waveguide gratings suitable for use for single mode waveguides significant adjustments must be made if the AWG is to be suitable for use with multimode waveguides.

The initial beam spreading or multimode interference coupler region must be increased somewhat to have the critical length specified by the need to meet the far field and phase conditions. Similarly the final focussing region or multimode interference coupler must be lengthened to meet the same criteria.

The intermediate waveguides 38 are single mode as in a conventional AWG, however a two dimensional array of these is preferably provided. This is because the light emerging from the input multimode waveguide 34 spreads horizontally in plane and vertically out of plane and so the input ends of the two dimensional array of single mode waveguides must be arranged on an ideally spherical surface corresponding to the spread wavefront. This single mode waveguide array consists of multiple closely spaced waveguides in both out of plane in in-plane array formation. At their other ends (not shown) the single mode waveguide exits lie on a converging wavefront, ideally spherical, so that the converging waves again recombine into different output multimode waveguides depending on their wavelengths.

In all the examples described above, the region between the end of the first (usually input) multimode waveguide and the WDM element need not be filled with air, but it could be a vacuum or an inert gas or a solid such as a polymer. In one example this region is filled with cladding polymer.

In this region the light spreads in the plane and also out of the plane. It is generally undesirable for the light to spread out of the plane so some means is preferably provided to ensure this spreading does not occur. Preferably, the light remains between a layer coincident with the top of the core waveguide and a layer coincident with the bottom of the core waveguide. This can be achieved in several ways. In one way, a metallised surface is put on these two planes only in the region between the waveguide and the waveguides. Alternatively it may only be in the region between the waveguide and the WDM element and similarly on the other side of it.

In one embodiment, the waveguide is placed as close to the separator/combiner as possible whilst still satisfying the requirement of being sufficiently far to carry out adequate WDM separation.

In a further different embodiment the separator/combiner is shaped in the vertical direction as a lens and placed 2 times the focal length away from the input and output waveguides so that it images the input waveguide exit interface onto the output waveguides entrance interfaces.

In a variant of this, a lens is placed between the input waveguide and the separator/combiner and between the separator/combiner and the output waveguides. The lens is placed a distance equal to its focal length from the input waveguide and also from the separator/combiner so that it acts to collimate and Fourier Transform the input light onto the separator/combiner. The lens on the other side of the separator/combiner serves to focus the light back into the waveguide as in an expanded beam connector configuration.

To achieve collimation a number of possible approaches may be used. One possible way involves putting a two surface lens between the exit of the waveguide and the wavelength selective element separated by the focal length of the lens from each element and also a similar arrangement at the output of the system.

Figure 7:
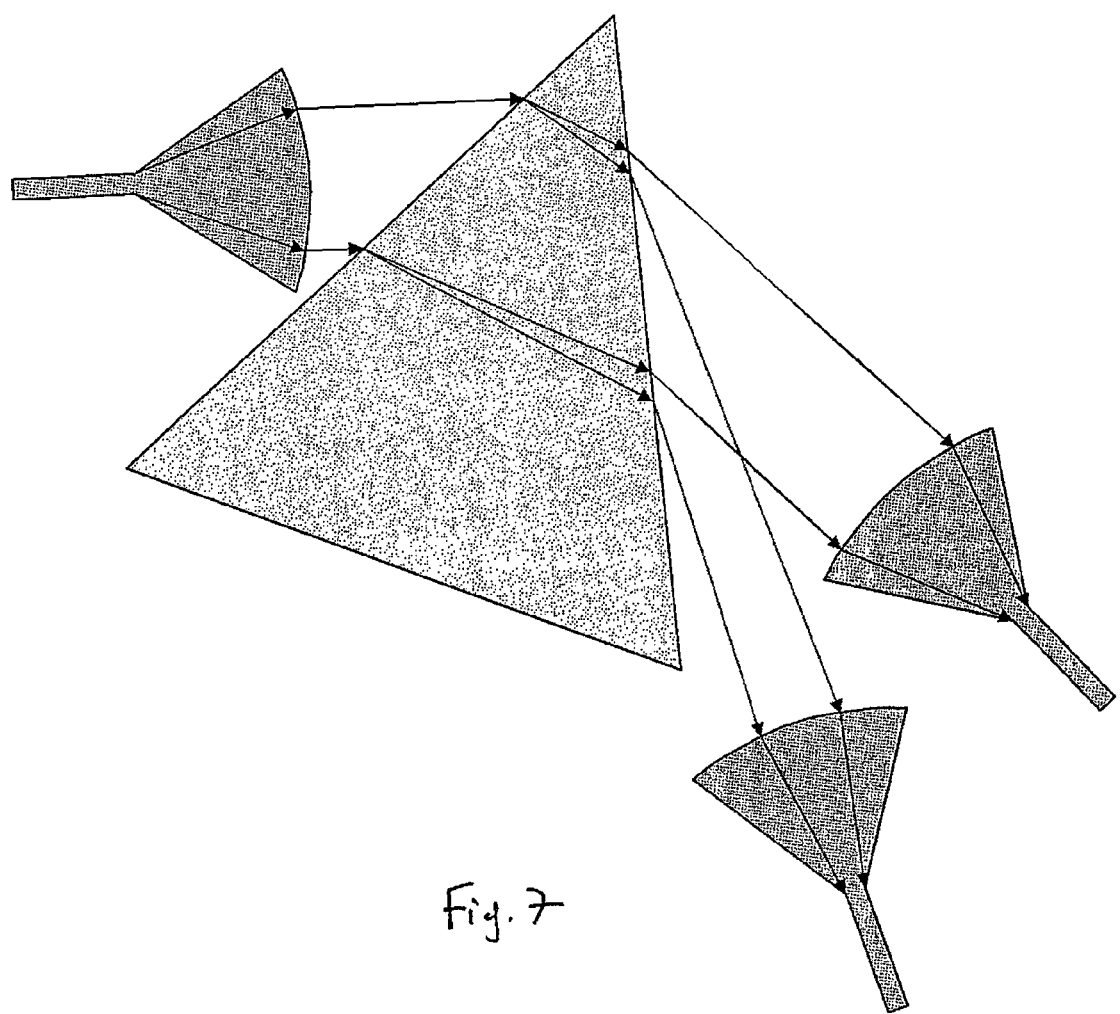
FIG. 7 shows an example of a multiplexer/demultiplexer in which the inputs and outputs of the waveguides are tapered.

As shown schematically in FIG. 7, another way involves tapering the output end of the input waveguide in width and, preferably thickness at an angle which is larger than any angle at which light rays are travelling inside the waveguide. Then the end of the waveguide is curved to form a lens but a sufficient distance must be allowed in the tapered section to meet the requirement of far field and phase matching conditions.

It is preferable that all elements must also be curved in the out-of-plane direction in order to offset out-of-plane divergence or are provided with a reflective surface above and below these elements. In one example, the reflective surfaces are metallic or are reflective due to a refractive index difference giving total internal reflection. Alternatively a dielectric stack such as in a photonic bandgap crystal may be used to provide the desired reflectivity.

Figure 8:
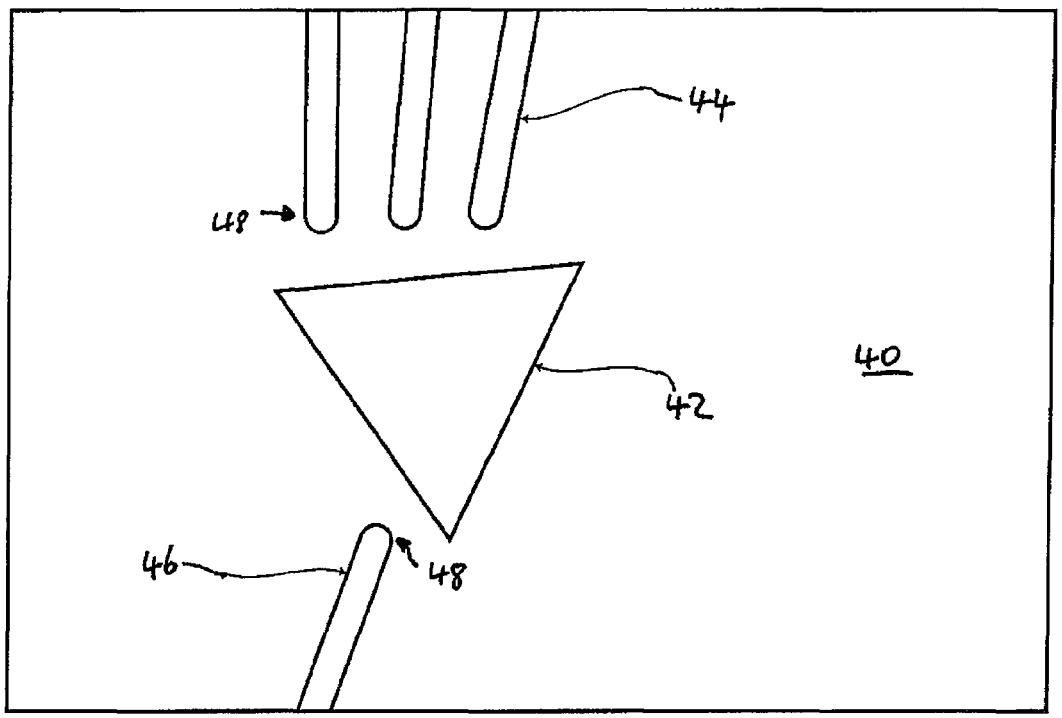
FIG. 8 is a schematic representation of an optical mask.

FIG. 8 is a schematic representation of an optical mask 40 for use in the formation of an optical multiplexer/demultiplexer. In this example, the mask is shown as an exposure mask in which cut-out regions are provided to determine regions in an optical layer that will be fixed once exposed to a curing radiation such as e.g. UV radiation. The opposite arrangement is also possible in which regions of the mask that are removed correspond to material that is to be removed from the optical layer.

The mask has a cut-out region 42 for the formation of a separator/combiner which in the present case would be a triangular prism. In addition, the mask includes regions 44 and 46 defining the position and configuration of optical waveguides. As will be appreciated, where a curable liquid optical material such as a polymer is arranged as a layer on a substrate and then exposed through a mask such as that shown in FIG. 8, the waveguides and separator/combiner will be formed in the same step since they are all defined by the same mask.

The mask is positioned over the layer of liquid polymer and then irradiated by, for example, ultraviolet radiation to cure the liquid polymer in the areas defined by the cut-out regions of the mask. The relative orientation of the separator combiner cut-out 42 and the waveguide cut-outs 44 and 46 is defined by the mask and therefore it is possible to achieve extremely accurate relative alignment between the separator/combiner 42 and the waveguides 44 and 46. In particular, there is no requirement to position and orientate a separator/combiner between the waveguides 44 and 46 once the waveguides have been formed. The relative orientation is defined by the position on the mask of the respective cut-outs, 42, 44 and 46.

The cut-outs 44 and 46 include end regions 48 which are shaped in such a way that when light is projected through them and the waveguides formed on the multiplexer/demultiplexer, the shape of the input/output interfaces of the waveguides is such as to at least partially collimate light passing therethrough. In other words, the interfaces of the waveguide are in the shape of collimating lenses. In this example the lenses will be half rod or cylindrical lenses due to the lithographic method of manufacture, which allows only structures of uniform 2D cross-section to be built. In other words, the uppermost surface of the structures are in a single flat plane. Other methods such as laser ablation whereby a cutting laser is used to etch away a controlled depth of material, by varying laser parameters such as power and exposure time, could be used to create a 3D profile, at least on the top side of the rod lens to fashion, e.g. a quarter spherical lens (one quarter of a sphere). In this case, the uppermost surface of the structures may be curved or otherwise shaped such that they are not in a single flat plane. Thus, the mask also enables any further optical component between the waveguides and the separator/combiner to be dispensed with. Thus, the mask and the method of manufacture enabled by it provides a simple and straightforward way by which an optical multiplexer/demultiplexer can be made.

Figure 9:
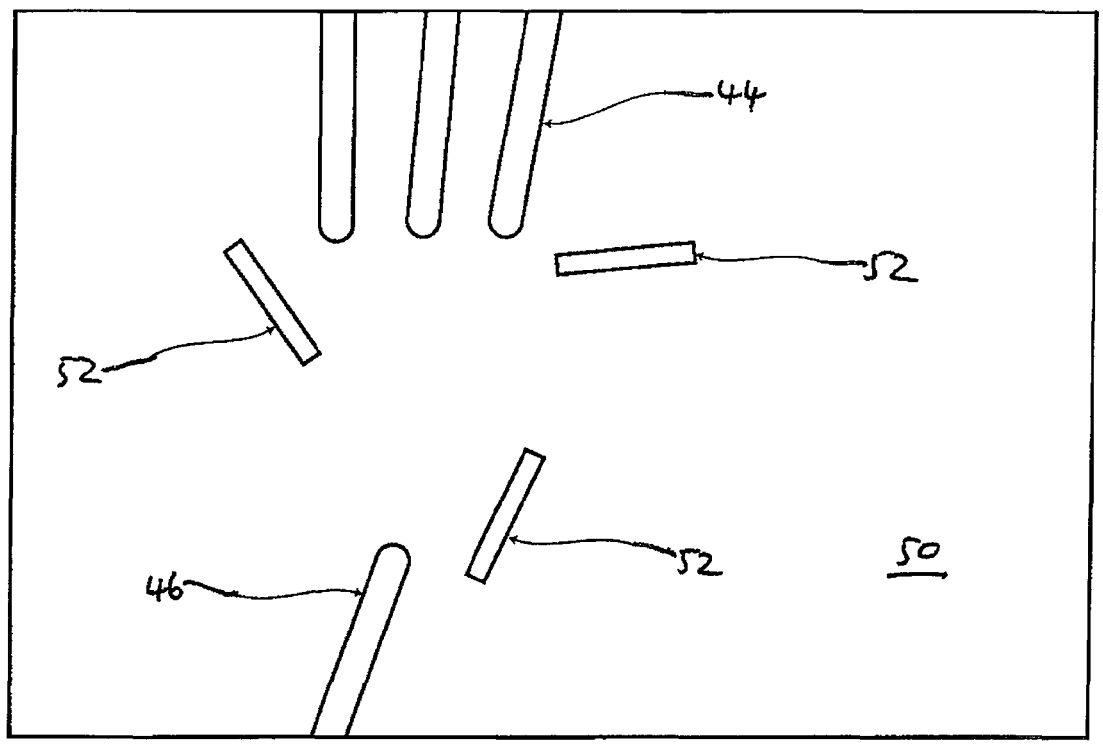
FIG. 9 is a schematic representation of a further example of an optical mask.

FIG. 9 shows a schematic representation of another example of an optical mask. In this case, the mask 50 includes cut-out regions 44 and 46 again, defining the shape of waveguides which will be formed from a curable layer of a liquid optical polymer. In this example, there is no cut-out region which defines itself a separator/combiner. Rather, there are cut-out regions 52 which serve to define projections against which a separator/combiner can be aligned in due course. In other words, although no separator/combiner is actually defined by a cut-out region on the mask, the relative configuration between the waveguides 44 and 46 and the separator/combiner that will eventually be used is defined by the mask. The relative position of the cut-out regions 52 is such as to fix the relative orientation of the separator/combiner when positioned against the projections that will be formed as a result of the cut-out regions 52.

Figure 10:
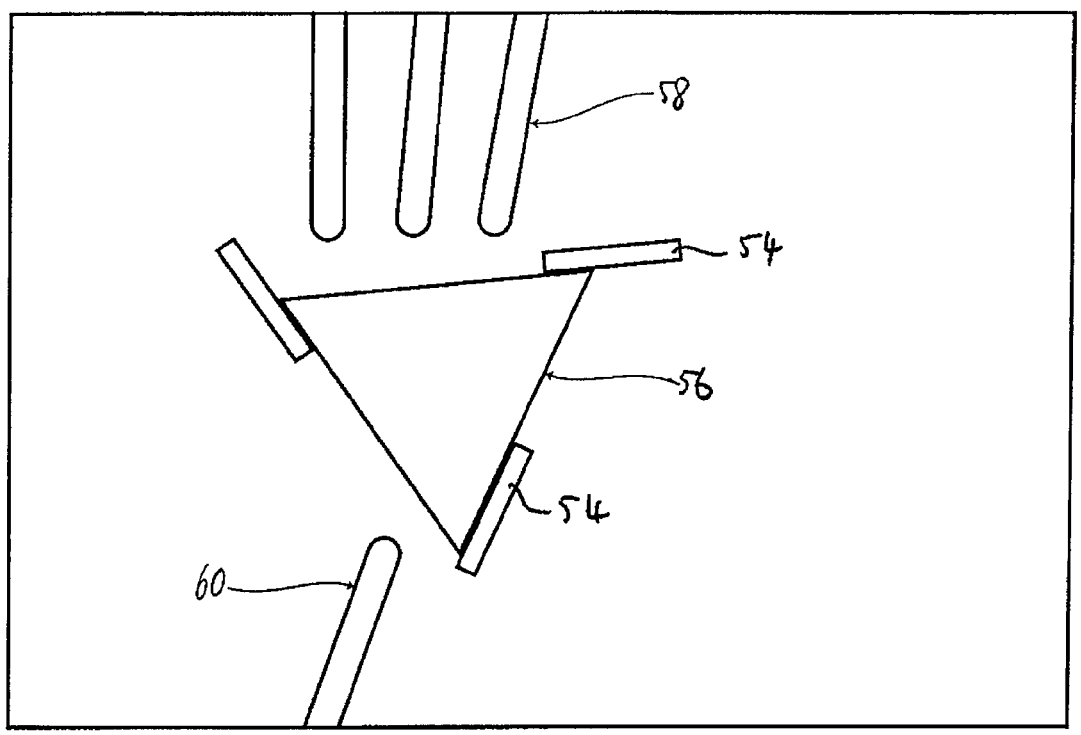
FIG. 10 is a schematic representation of an optical component of an optical multiplexer/demultiplexer on an optical PCB.

FIG. 10 shows a schematic representation of the optical components of an optical multiplexer/demultiplexer. In this example, a number of projections 54 can be seen formed by the cut-out regions 52 in the mask of FIG. 9. A triangular prism 56 is provided within the optical alignment projections such that it can be appreciated that its relative orientation with respect to the waveguides 58 and 60 is defined during the manufacture of the waveguides 58 and 60. Thus, extremely accurate relative alignment between the waveguides and the separator/combiner is achieved.

Figure 11:
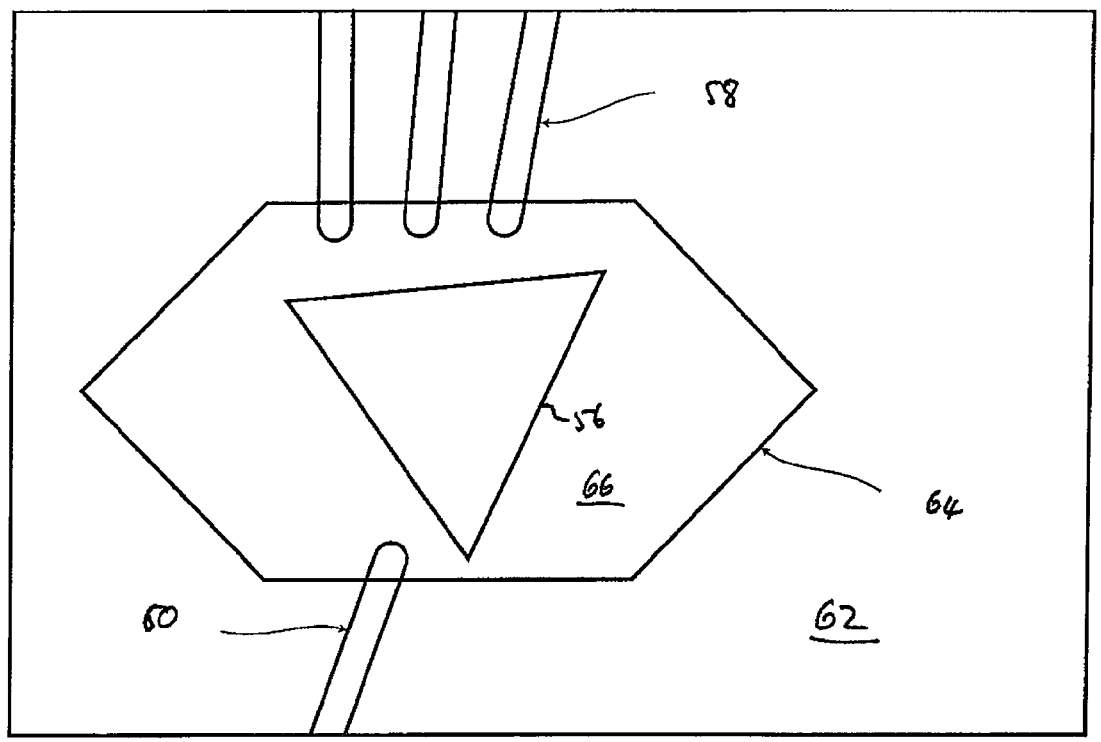
FIG. 11 is a schematic representation of an optical PCB with a mask arranged over it in close proximity for the formation of a cladding layer.

FIG. 11 is a schematic representation of an optical mask 62 arranged over the waveguides 58 and 60 and the separator/combiner 56. The mask is suitable for use in the formation of an optical upper cladding layer. The mask, in this example, includes a single region 64 which is arranged in use to block out radiation so as to define a cut-out region 66 out of an upper cladding layer that is provided over the waveguides 58 and 60 and the separator/combiner 56. The cut-out region 66 enables there to be a large refractive index difference over the boundary of the waveguides and the separator/combiner. Thus, the collimation and separating and combining properties of the optical components may be maximised. In use, a protective barrier layer may be placed over the cut-out region 66 to stop the region becoming filled with dirt and dust during use.

While the present invention has been described with respect to specific embodiments and applications thereof, numerous alternatives, modifications, and applications, and variations will be apparent to those skilled in the art having read the foregoing description. The invention is intended to embrace those alternatives, modifications, and variations as fall within the broad scope of the appended claims. Accordingly, the scope of the invention should be limited only by the attached claims.

The invention claimed is:

1. An optical multiplexer/demultiplexer for an optical printed circuit board, the multiplexer/demultiplexer comprising:
    a first waveguide formed in a first step on a support layer for carrying a wavelength division multiplexed optical signal;
    a separator/combiner formed in the same step as the first waveguide for separating the wavelength division multiplexed signal into component signals of corresponding wavelengths or for combining component signals into the wavelength division multiplexed signal;
    plural second waveguides formed in the same step as the first waveguide and the separator/combiner, each of the second waveguides being for receiving or providing one or more of the component signals, wherein the separator/combiner is at a predetermined location relative to the waveguides, the input/output interfaces of the waveguides being shaped to at least partially collimate light passing therethrough;
    wherein the distance (z) between the first optical waveguide and the optical separator/combiner is determined by the equation:

$$z > \frac{2D^2(\cos\theta)^2}{\lambda}$$

in which
    D is the diameter or width of the waveguide;
    λ is the wavelength of the light in question; and,
    θ is the angle that the rays in question travel from the main longitudinal waveguide axis.

2. An optical multiplexer/demultiplexer according to claim 1, wherein the combiner/separator comprises a microprism array.

3. An optical multiplexer/demultiplexer according to claim 2, wherein the microprism array comprises plural prisms substantially identical to each other.

4. An optical multiplexer/demultiplexer according to claim 1, wherein the combiner/separator comprises one or more of a lensed grating, a curved grating, a cut-off section of a dispersive lens and a cut-off section of a diffractive or refractive Fresnel lens.

5. An optical multiplexer/demultiplexer according to claim 1, wherein any or all of the waveguides are multimode waveguides.

6. An optical printed circuit board, comprising at least one optical multiplexer/demultiplexer according to claim 1.

7. An optical printed circuit board according to claim 6, comprising:
   a first waveguide for carrying a multiplexed optical signal; and,
   plural second waveguides for carrying component optical signals of the multiplexed optical signal.

8. An optical printed circuit board according to claim 7, in which the waveguides are provided with a cladding and in which the separator/combiner is arranged within a channel in the cladding such that air or another medium is present between the waveguide input/output interfaces and the separator/combiner.

9. An optical multiplexer/demultiplexer for an optical printed circuit board, the multiplexer/demultiplexer comprising:
   a first waveguide formed in a first step on a support layer for carrying a wavelength division multiplexed optical signal;
   a separator/combiner for separating the wavelength division multiplexed signal into component signals of corresponding wavelengths or for combining component signals into the wavelength division multiplexed signal;
   plural second waveguides formed in the same step as the first waveguide, each of the second waveguides being for receiving or providing one or more of the component signals, wherein the separator/combiner is at a predetermined location relative to the waveguides, the input/output interfaces of the waveguides being shaped to at least partially collimate light passing therethrough, wherein the separator/combiner is arranged with reference to an alignment feature of the multiplexer/demultiplexer the alignment feature being formed in the same step as the first waveguide and the plural second waveguides;
   wherein the distance (z) between the first optical waveguide and the optical separator/combiner is determined by the equation:

$$z > \frac{2D^2(\cos\theta)^2}{\lambda}$$

in which
D is the diameter or width of the waveguide;
$\lambda$ is the wavelength of the light in question; and, $\theta$ is the angle that the rays in question travel from the main longitudinal waveguide axis.

10. An optical multiplexer/demultiplexer according to claim 9, wherein the alignment feature comprises a projection formed in a region between the first waveguide for carrying the multiplexed signal and the plural second waveguides.

11. An optical multiplexer/demultiplexer according to claim 10, wherein the combiner/separator comprises a dispersive prism aligned against the projection feature.

12. An optical multiplexer/demultiplexer according to claim 9, wherein any or all of the waveguides are multimode waveguides.

13. An optical multiplexer for an optical printed circuit board, the multiplexer comprising:
   a first multimode waveguide formed in a first step for carrying a multiplexed optical signal; one or more second waveguides formed in the same step as the first multimode waveguide, each for carrying a component of the multiplexed optical signal; and
   an optical separator/combiner, the optical separator/combiner being for separating the multiplexed optical signal into components or for combining the components into the multiplexed optical signal, wherein a separation between the first multimode optical waveguide and the optical separator/combiner is sufficient such that an angular range of direction of propagation of light entering the separator/combiner from the first multimode optical waveguide is sufficiently small to enable separation of wavelength components, wherein there is a distance (z) between the first multimode optical waveguide and the optical separator/combiner, the distance (z) being determined by the equation:

$$z > \frac{2D^2(\cos\theta)^2}{\lambda}$$

in which
D is the diameter or width of the waveguide;
$\lambda$ is the wavelength of the light in question; and,
$\theta$ is the angle that the rays in question travel from the main longitudinal waveguide axis.

14. An optical multiplexer according to claim 13, wherein, the separator/combiner is a diffractive separator/combiner, and path lengths from each point on an output face of the first waveguide to each point on input faces of the one or more second waveguides do not differ by more than a fraction of a wavelength.

15. An optical multiplexer according to claim 14, wherein a maximum difference between the path lengths is less than 0.01 radians.

16. An optical multiplexer according to claim 13, in which path lengths from each point on the output face of the first waveguide to each point on the input face of any of the second waveguides for each wavelength does not differ by more than a fraction of a bit length.

* * * * *